US008681394B2

(12) United States Patent
Ikebata

(10) Patent No.: US 8,681,394 B2
(45) Date of Patent: Mar. 25, 2014

(54) IMAGE FORMING APPARATUS

(75) Inventor: Yoshiaki Ikebata, Osaka (JP)

(73) Assignee: Kyocera Document Solutions Inc, Osaka (JP)

( * ) Notice: Subject to any disclaimer, the term of this patent is extended or adjusted under 35 U.S.C. 154(b) by 326 days.

(21) Appl. No.: 13/152,179

(22) Filed: Jun. 2, 2011

(65) Prior Publication Data

US 2011/0299139 A1 Dec. 8, 2011

(30) Foreign Application Priority Data

Jun. 2, 2010 (JP) ................................ 2010-126636

(51) Int. Cl.
*H04N 1/04* (2006.01)
*H04N 1/00* (2006.01)

(52) U.S. Cl.
USPC ........... 358/474; 358/401; 358/497; 399/379; 399/380

(58) Field of Classification Search
None
See application file for complete search history.

(56) References Cited

U.S. PATENT DOCUMENTS 4,989,099 A * 1/1991 Koshiyouji et al. ........... 358/474
6,462,839 B1 * 10/2002 Short ............................ 358/474
7,349,131 B2 * 3/2008 Amemiya et al. ............ 358/474
7,447,466 B2 * 11/2008 Ikebata ......................... 399/110
7,605,954 B2 * 10/2009 Manabe et al. ............... 358/474
7,680,431 B2 * 3/2010 Ikebata ......................... 399/107
7,773,267 B2 * 8/2010 Kim et al. ..................... 358/296
2011/0134455 A1 * 6/2011 Nagashima et al. ......... 358/1.13
2011/0242626 A1 * 10/2011 Nagashima ................... 358/498
2011/0299884 A1 * 12/2011 Uchida ......................... 399/110

FOREIGN PATENT DOCUMENTS

JP H08-20842 B2 3/1996
JP 2003122080 A 4/2003
JP 2003-177838 A 6/2003
JP 2005-189552 A 7/2005
JP 2006106722 A 4/2006
JP 2007-47570 A 2/2007

OTHER PUBLICATIONS

Notice of Reasons for Rejection issued to JP Application No. 2010-126636 mailed Dec. 11, 2012.

* cited by examiner

*Primary Examiner* — Cheukfan Lee
(74) *Attorney, Agent, or Firm* — Knobbe Martens Olson & Bear LLP

(57) ABSTRACT

An image forming apparatus includes an apparatus main body, a housing body, and an outer wall member. The housing body can displace and rotate to a housing body fully closed angle position, a housing body fully open angle position, and a housing body non-access angle position. The outer wall member is disposed between the apparatus main body and the housing body, and connected to the apparatus main body to displace and rotate in response to the displacement and rotation of the housing body, and positioned at an outer wall fully closed angle position, an outer wall fully open angle position, and an outer wall non-access angle position that has an angular position enabling exposure of exchangeable components inside the apparatus main body but not enabling exchange by a user.

6 Claims, 11 Drawing Sheets

IMAGE FORMING APPARATUS

This application is based on and claims the benefit of priority from Japanese Patent Application No. 2010-126636, filed on 2 Jun. 2010, the content of which is incorporated herein by reference.

BACKGROUND OF THE INVENTION

1. Field of the Invention

The present invention is related to an image forming apparatus such as a copying machine, a printer, a facsimile, or the like.

2. Related Art

The image forming apparatus includes apparatus main body, and a document conveyance apparatus or image reading means (for example, a scanner unit) disposed on an upper side of the apparatus main body. A document set in the document conveyance apparatus, or a document disposed on the scanner unit is optically read by the scanner unit.

An image forming apparatus that uses an electrophotographic process pre-charges a photosensitive drum contained in the image forming means, irradiates light onto the surface of the photosensitive drum to thereby form an electrostatic latent image, develops a toner image with a developing device, transfers the toner image with a transfer unit onto a recording material, fixes the toner image onto the recording material with a fixing unit, and thereby forms an image on the recording material.

The high-weight scanner unit is housed in the housing body. An image reading apparatus has been proposed that includes an opening/closing moveable configuration from a position at which the housing body is fully closed to an open position at which the inner portion of the apparatus main body is visible. A structure is disclosed in which consumable products such as toner containers, or the like, or maintenance disposed in an inner portion of the image forming apparatus are configured in an attachable/detachable state by moving the housing body between an open and a closed position.

For example, an image forming apparatus has been proposed in which the back surface of the housing body forms the outer wall of the apparatus main body, and when the housing body is rotated with respect to the apparatus main body, the inner portion of the apparatus main body is exposed to enable access by a user to exchangeable components. Furthermore, an image forming apparatus has been proposed in which an outer wall member that also functions as a discharge tray is provided on the back surface of the housing body, and when the outer wall member is opened with respect to the apparatus main body together with an operation of opening the housing body, the inner portion of the apparatus main body is exposed to enable access by a user to exchangeable components.

However the conventional technique above is associated with the problem that the apparatus main body is damaged as a result of erroneous operation in relation to the exchangeable components in the apparatus main body by a user.

For example, the toner containers include a drive coupling or shutter.

Consequently, the engagement between the shutter coupling or the drive coupling near the apparatus main body of the toner containers is released when the housing body is in a fully open configuration (housing body full open angle position). In this manner, a user can easily grasp and pull out a toner container.

In contrast, when the housing body is completely closed (fully closed angle position), the toner container is completely engaged with the drive coupling or the like on the apparatus main body.

However, even when the housing body is in a configuration of being slightly more closed than the fully open configuration (housing body fully open angle position) (a configuration slightly open from a fully closed configuration), the drive couplings are engaged (in addition to the shutter and the shutter coupling in the example of a toner container). If a user grasps and pulls out a toner container when in this engaged state, the drive coupling on the apparatus main body side may be damaged. Toner may be dispersed from a toner resupply port that is exposed by the open shutter and therefore contaminate the apparatus main body.

In other words, in a configuration in which the housing body is an open configuration and not positioned at the fully open configuration, damage may occur to the connecting portion on the apparatus main body side or damage may occur to exchangeable components, or an adverse effect may result due to dispersal of toner as a result of a user accessing the apparatus main body and pulling drawing out an exchangeable component.

SUMMARY OF THE INVENTION

Therefore, it is an object of the present invention to provide an image forming apparatus in which user access to the inner portion of an apparatus main body is executed when the housing body is positioned in a fully open angle position.

An image forming apparatus includes an apparatus main body having a first surface and a second surface opposed in a first direction, and housing exchangeable components, a housing body for housing an image reading means that can optically read a document, disposed on an upper surface side of the apparatus main body, and in which a first end is rotatably connected near the second surface, the housing body rotatably displaces to a housing body fully closed angle position at which the second end near to the first surface is disposed in closest proximity to the apparatus main body, a housing body fully open angle position at which the second end is most separated from the apparatus main body, and a housing body non-access angle position between the housing body closed angle and the housing body fully open angle, and that is in proximity to the housing body fully closed angle position, an outer wall member disposed between the apparatus main body and the housing body, rotatably connected to the apparatus main body, and displacing and rotating in response to the displacement and rotation of the housing body, and when the housing body is positioned at the housing body fully closed angle position, the outer wall member is positioned at an outer wall fully closed angle position at which the exchangeable components in the inner portion of the apparatus main body are not exposed, when the housing body is positioned at the housing body fully open angle position, the outer wall member is positioned at an outer wall fully open angle position at which the exchangeable components in the inner portion of the apparatus main body are exposed to enable exchange by a user, and when the housing body is positioned at the housing body non-access angle position, the outer wall member is positioned at an outer wall non-access angle position that has a rotation angle at which the exchangeable components in the inner portion of the apparatus main body are exposed but cannot be exchanged by a user, a link member configured to reciprocally displace in a first direction so that a first end is connected rotatably to the housing body, and a second end is positioned at a first position in closest proximity to the first surface when the housing body is positioned at the housing body fully closed angle position, is positioned at a second position in closest proximity to the second surface when the housing body is positioned at a housing body fully open angle position, and is positioned at a third position between the first position and the second position in proximity to the first position when the housing body is positioned at a housing body non-access angle position;

a first retaining portion retaining the second end of the link member at the second position, and a second retaining portion retaining the second end of the link member at the third position.

DETAILED DESCRIPTION OF THE INVENTION

The preferred embodiments of the present invention will be described below making reference to the figures.

Figure 1:
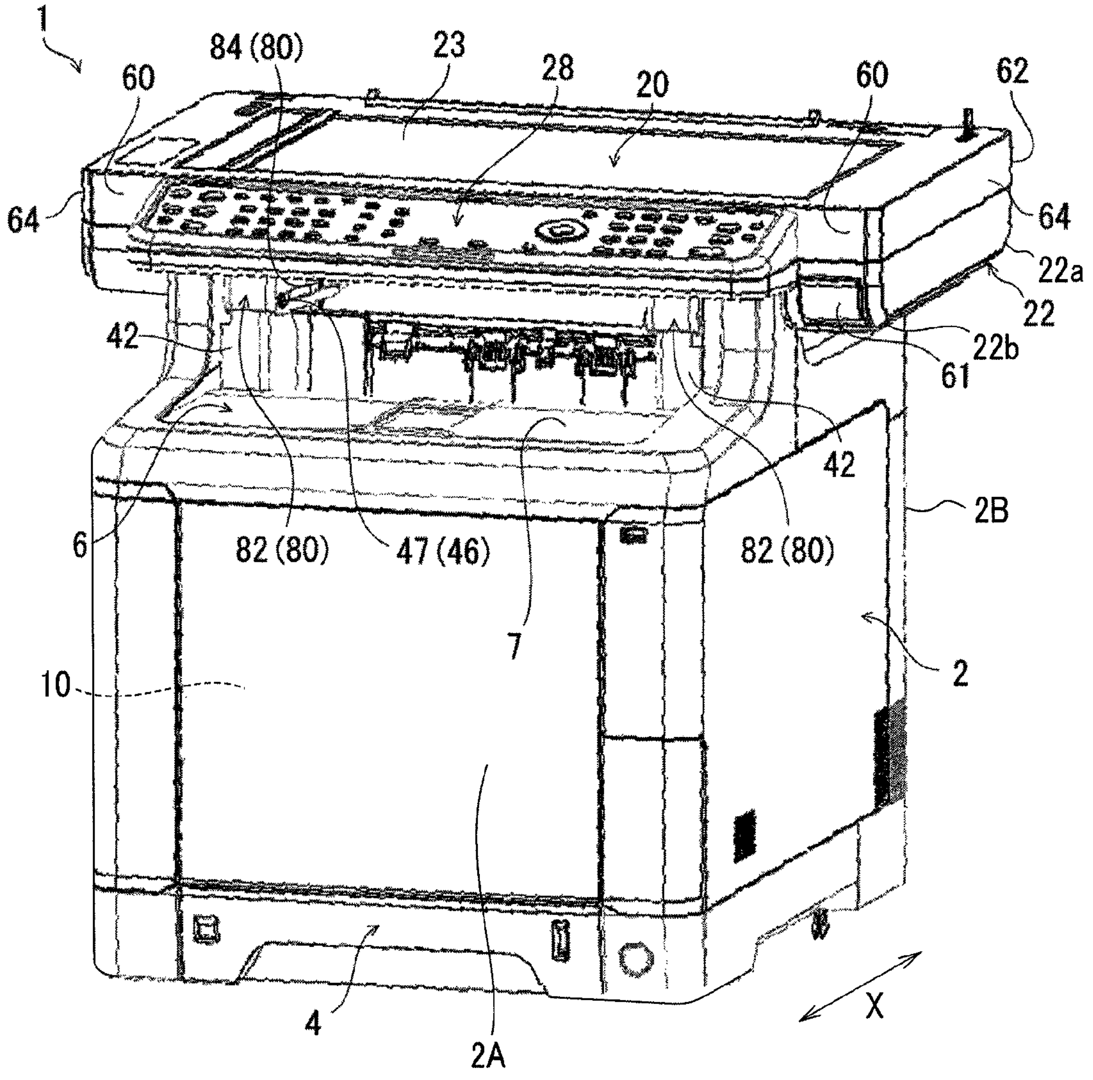
FIG. 1 is an external perspective view of a multifunction peripheral according to an embodiment.

FIG. 1 is an external perspective view of a multifunction peripheral according to an embodiment.

In FIG. 1, a digital multifunction peripheral that is an example of an image forming apparatus, that is a so-called multiple function peripheral (hereinafter referred to as "MFP") 1 is illustrated from the upper right front direction. In the figure, a front surface 2A and a right surface of the MFP 1 relative to a user are illustrated.

The MFP 1 includes a box-shaped apparatus main body 2 that houses a print engine 10 (image forming means) that can output an image to a sheet of paper (recording material). The sheet of paper on which an image is formed (outputted) by the print engine 10 is discharged to an upper side of the apparatus main body 2.

More specifically, the inner portion of the apparatus main body 2 is covered by an outer wall member 6 that is disposed thereupon. The surface 7 of the outer wall member 6 illustrated in FIG. 1 functions as a discharge tray.

An optical scanner unit (image reading means) 20 is provided on an upper side of the apparatus main body 2 according to the present embodiment.

Although omitted from the figures, an automatic document feeder (hereinafter referred to as an ADF) can be mounted on an upper side of the scanner unit 20.

When the MFP 1 is used as a copying machine, a facsimile or a network scanner, the ADF conveys a document to a predetermined reading position in the scanner unit 20. Then, the scanner unit 20 optically reads an image of the document.

The scanner unit 20 is stored in the casing (housing body) described below. An operating panel 28 is provided on a front side of the casing 22.

The operation panel includes a plurality of operation keys that are used in various operations by a user and an operation screen that displays various types of information such as character information, guide images, or the like. The operational content of the panel and keys is notified to a controller 39.

A front-loading paper supply apparatus is disposed in a lower portion of the apparatus main body 2.

The supply apparatus includes a paper cassette 4 (FIG. 1). The paper cassette 4 stores paper in a stacked configuration with respect to a thickness direction. The paper cassette 4 is configured to be pulled out of the apparatus main body 2.

Figure 2:
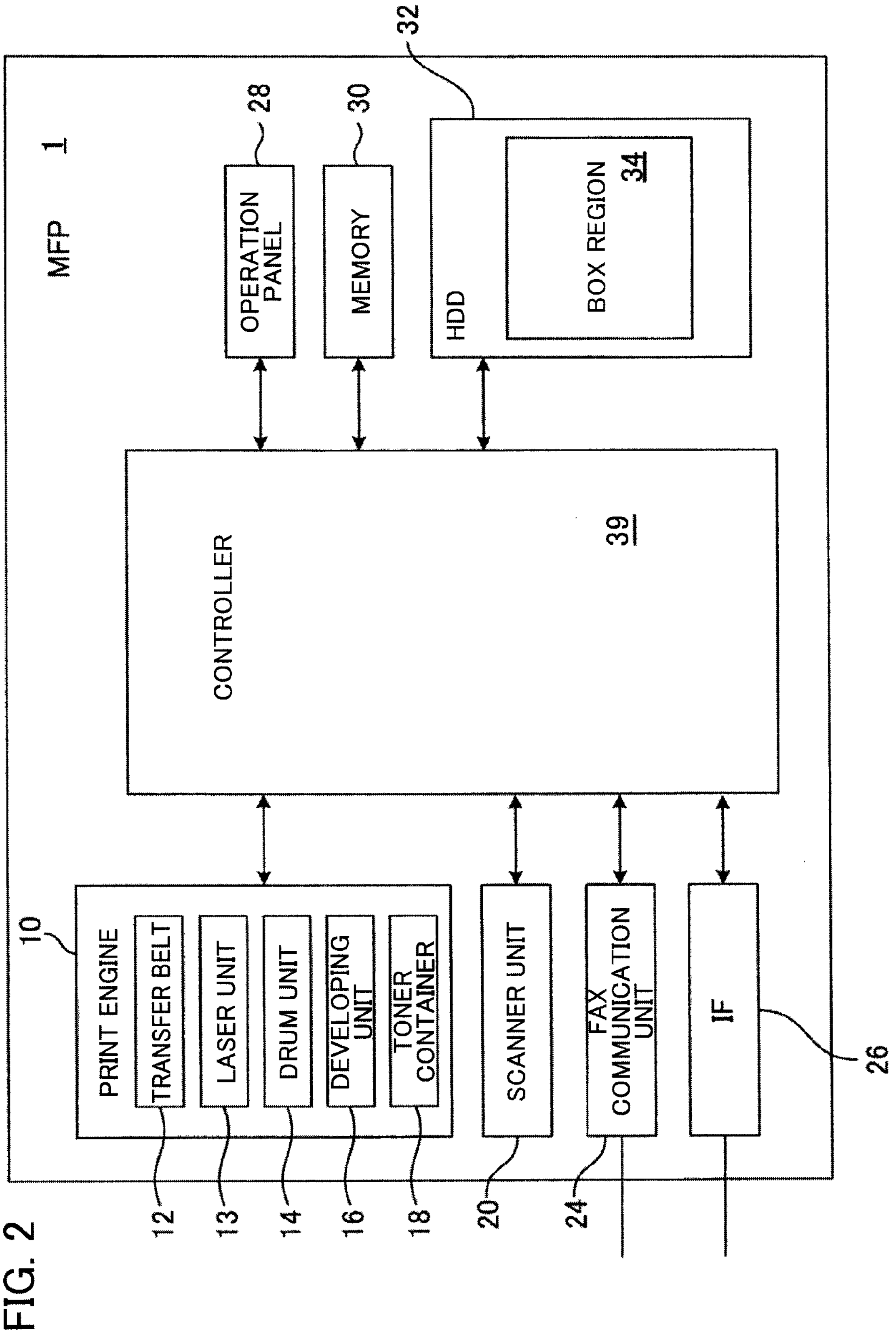
FIG. 2 is a block diagram of the multifunction peripheral.

FIG. 2 is a block diagram of the multifunction peripheral (MFP 1).

The MFP 1 is connected to a network through a network interface (IF) 26, and is also connected to a public line.

The MFP 1 executes various types of operations according to instructions from programs.

The MFP 1 includes for example a printing function (copy function), a transmission function (send function) and a storage function (box function).

A HDD 32 includes a box region 34. The HDD 32 successively stores various types of data including a print job sent from a client PC, a scan job read by the scanner unit 20, and a facsimile job received by the FAX communication unit 24, and includes a box function.

The MFP 1 includes a memory 30. The memory 30 includes a ROM, a RAM, or the like, and stores programs and the like for various types of operations.

The FAX communication unit 24 includes a send function, and sends a facsimile job stored in the HDD 32 to a partner address.

The print engine (image forming means) 10 is stored in the apparatus main body 2. The print engine 10 includes a laser unit 13 that forms an electrostatic latent image, a drum unit 14 that forms an electrostatic latent image corresponding to each color, toner containers 18 that store toner of each color, a developing unit 16 that develops a toner image using each type of toner in the toner containers 18, and an intermediate transfer belt 12 that transfers the toner image to a sheet of paper.

The print engine (image forming means) 10 forms (outputs) an image of a sheet of paper based on the print job stored in the HDD 32. The sheet of paper on which the image is formed (outputted) is discharged to the surface of the outer wall member 6. The print engine 10 includes a copy function.

The intermediate transfer belt 12, the drum unit 14, the developing unit 16, the toner containers 18, and the like are housed on an upper side of the paper cassette 4 in the apparatus main body 2. The toner containers 18 in the present embodiment are disposed from the front surface of the MFP 1 in order of magenta, cyan, yellow and black.

The longitudinal dimension of the casing 22 (housing body) according to the present embodiment is formed in a substantially rectangular shape that has a larger width than the width of the front surface of the MFP 1, and a contact glass 23 is disposed on an upper surface thereof (FIG. 1).

The constituent components of the scanner unit 20 are stored on a lower side of the contact glass 23 in the casing 22.

The scanner unit 20 includes a carriage, a CCD, or the like (both not illustrated) that reads the image data of the document. The carriage irradiates light towards the contact glass 23, and displaces along the longitudinal direction of the casing 22. The irradiated light is read by the CCD above, and converted to a predetermined signal.

The laser unit 13 forms an electrostatic latent image of the document image on a photosensitive drum of the drum unit 14 based on the image information read by the CCD.

Figure 3:
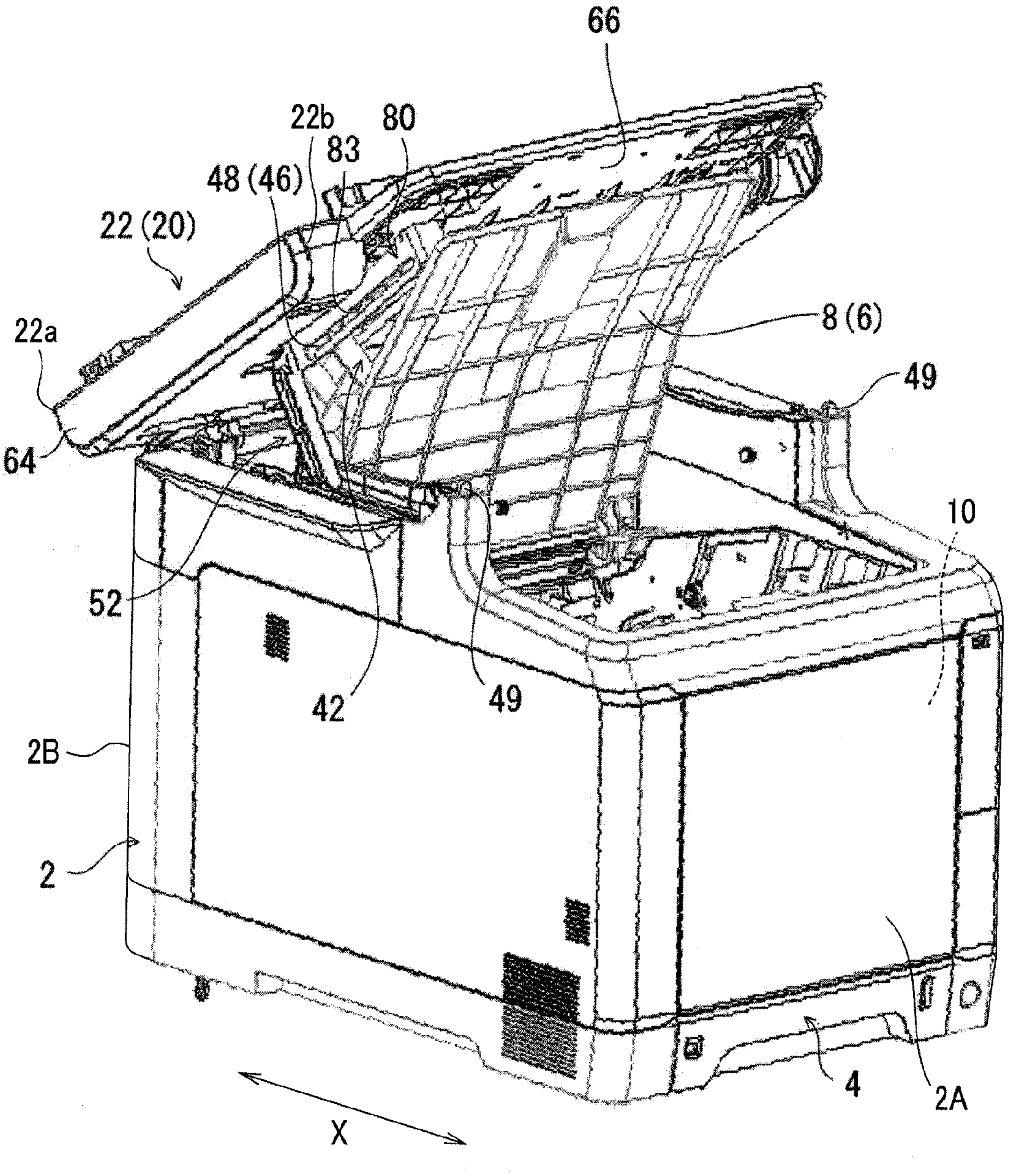
FIG. 3 is a perspective view of a multifunction peripheral in a configuration which a casing (housing body) is positioned at a housing body fully open angle position, and an outer wall member is positioned at an outer wall fully open angle position that exposes an inner portion of the apparatus main body.
Figure 4:
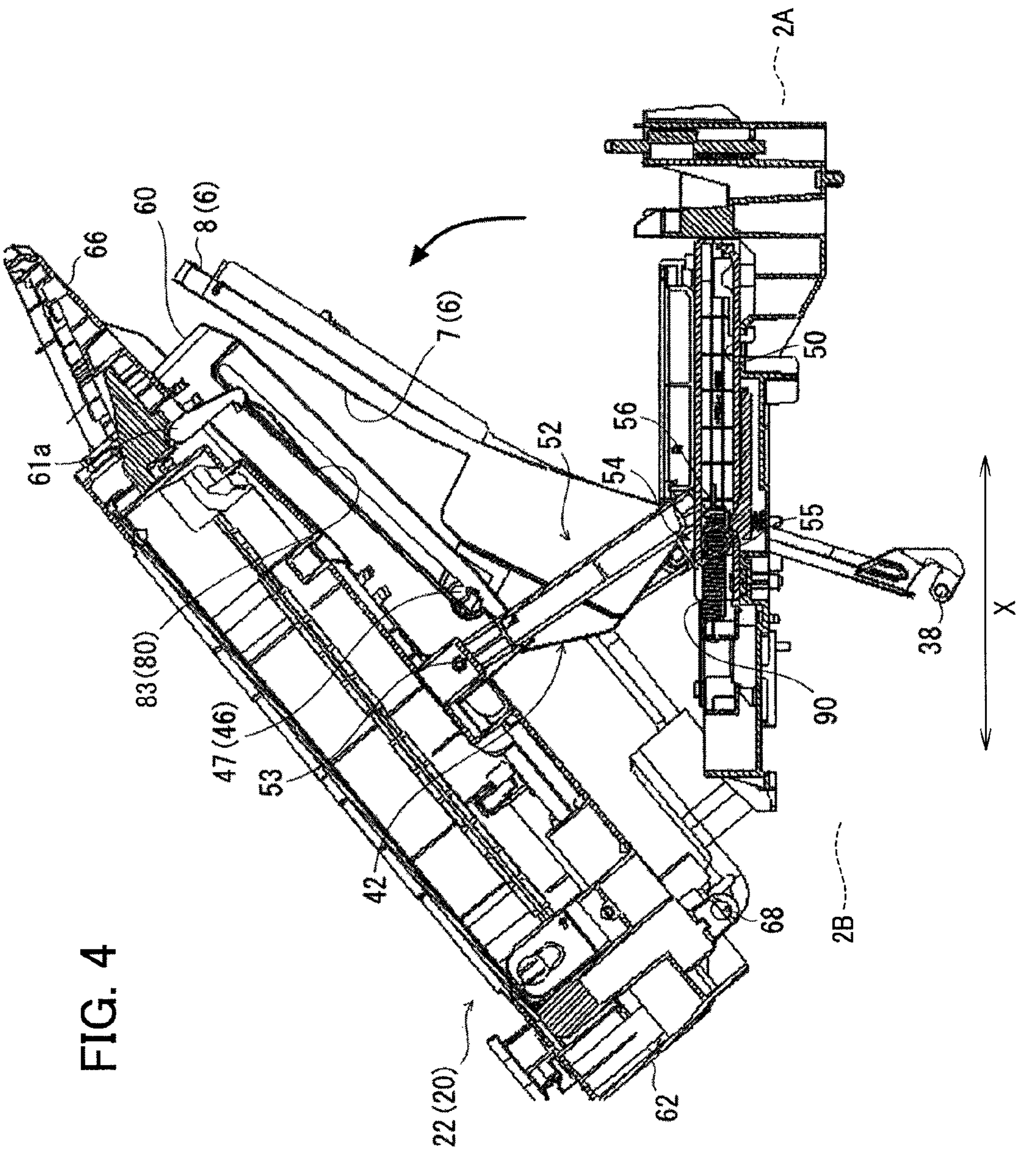
FIG. 4 is a side view of a state in which the casing (housing body) is positioned at a housing body fully open angle position, and the outer wall member is positioned at the outer wall fully open angle position.
Figure 5:
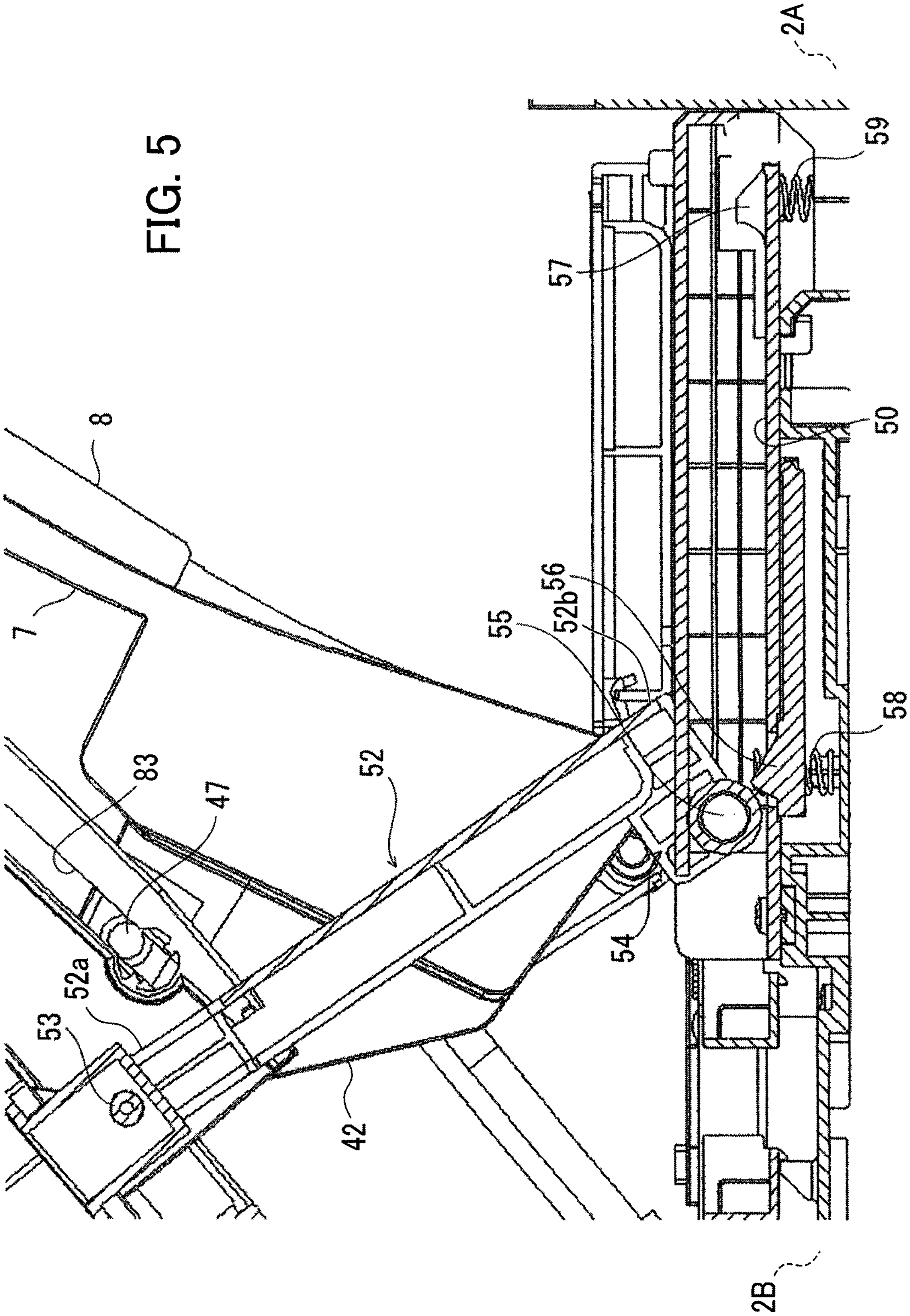
FIG. 5 is a schematic enlarged view of FIG. 4.
Figure 6:
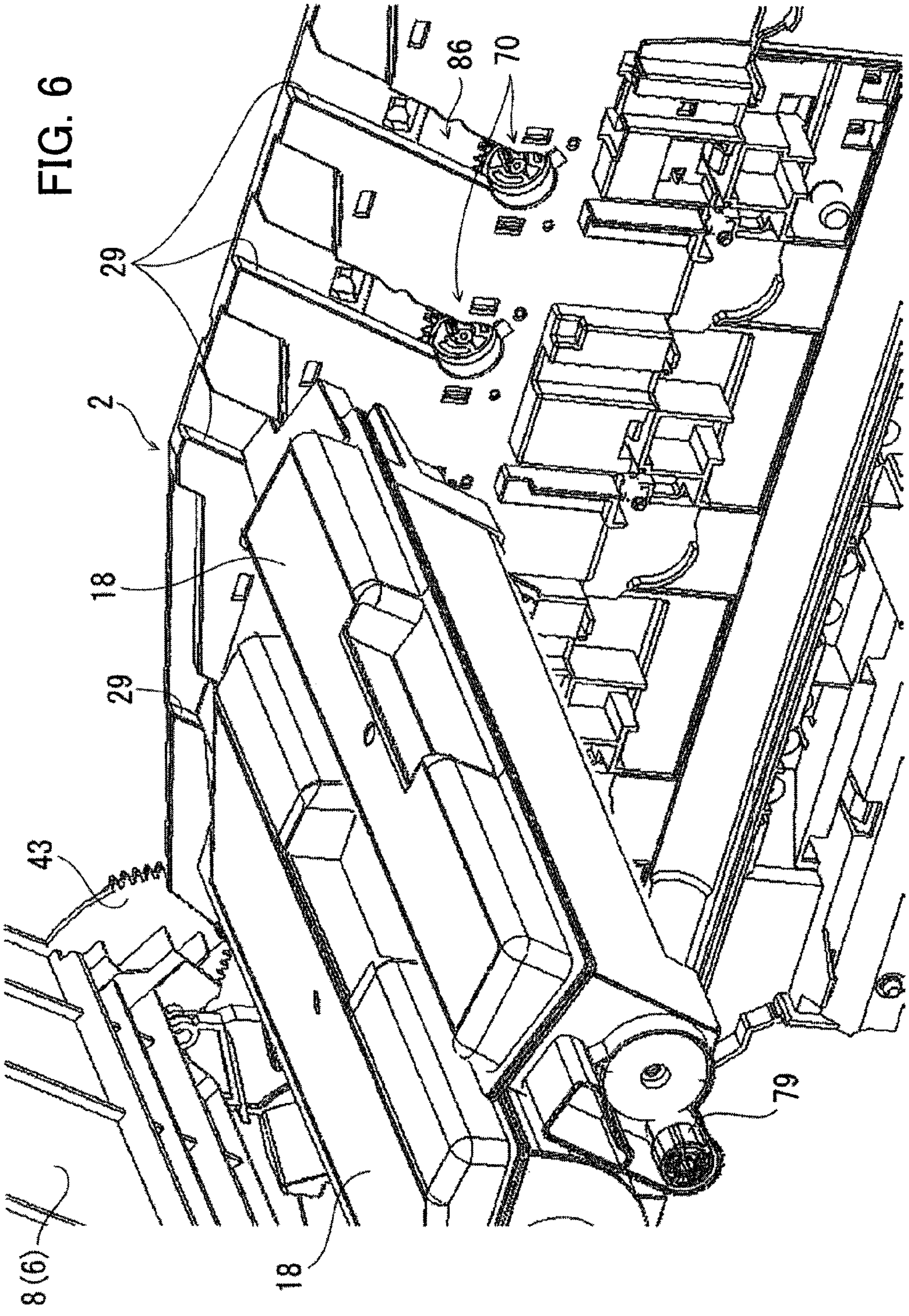
FIG. 6 is an enlarged perspective view of an inner portion of the apparatus main body illustrated in FIG. 3.
Figure 7A:
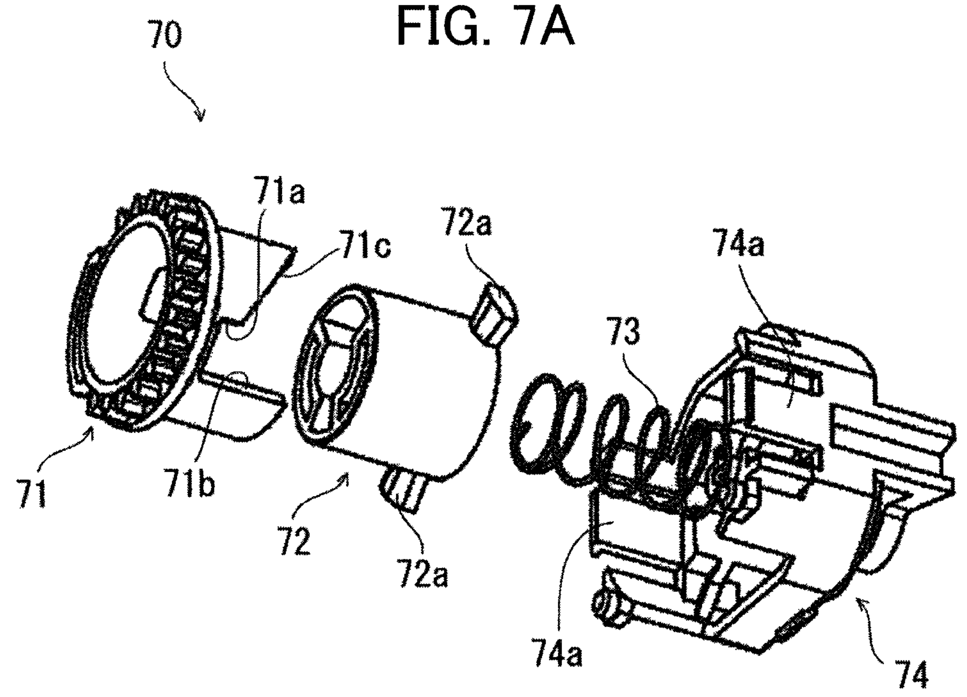
FIG. 7A is a perspective view of the coupling illustrated in FIG. 6.
Figure 7B:
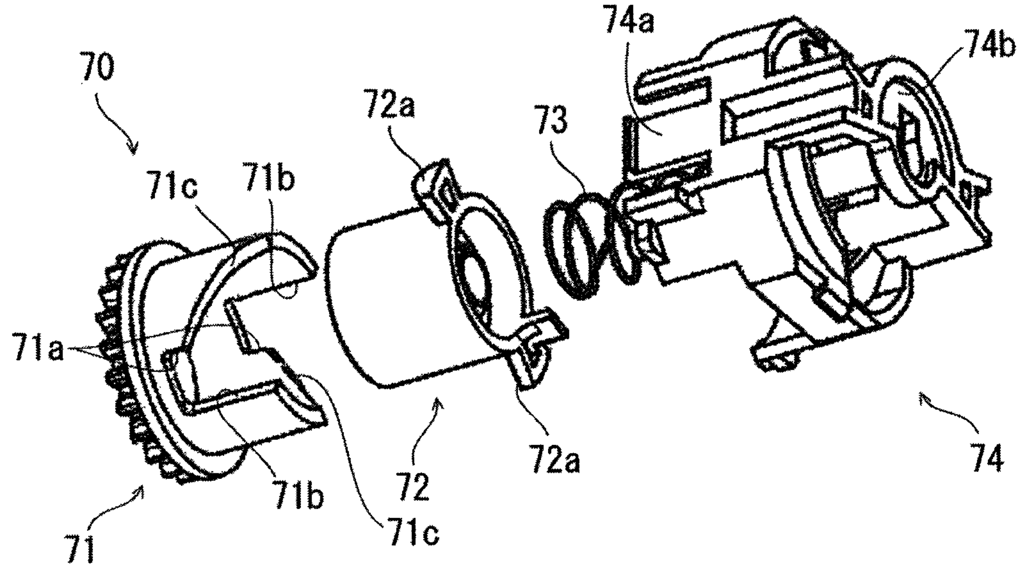
FIG. 7B is a perspective view of the coupling illustrated in FIG. 6.
Figure 8A:
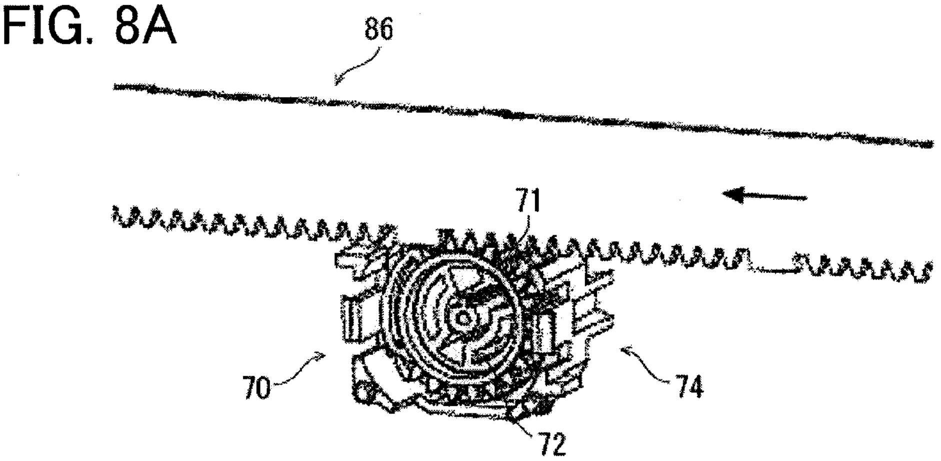
FIG. 8A describes the operation of the casing and the coupling illustrated in FIG. 6.
Figure 8B:
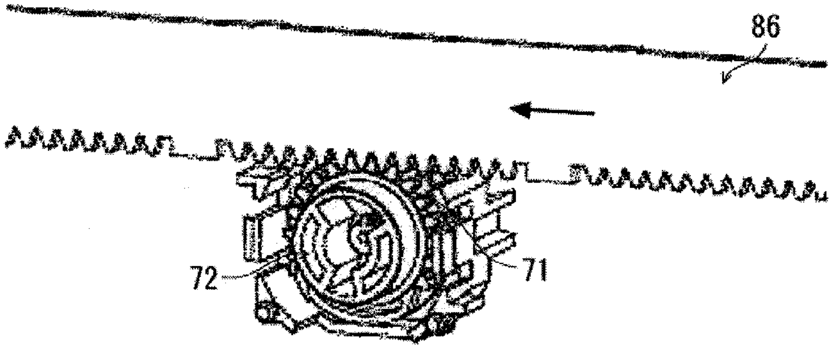
FIG. 8B describes the operation of the casing and the coupling illustrated in FIG. 6.
Figure 8C:
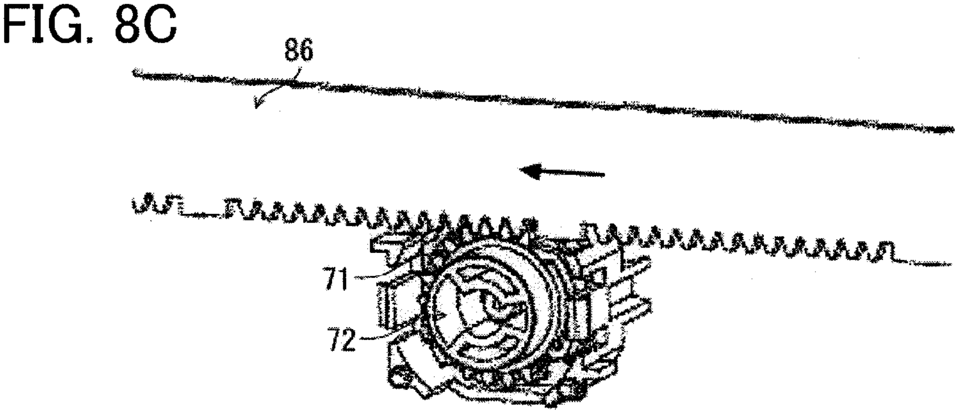
FIG. 8C describes the operation of the casing and the coupling illustrated in FIG. 6.
Figure 9:
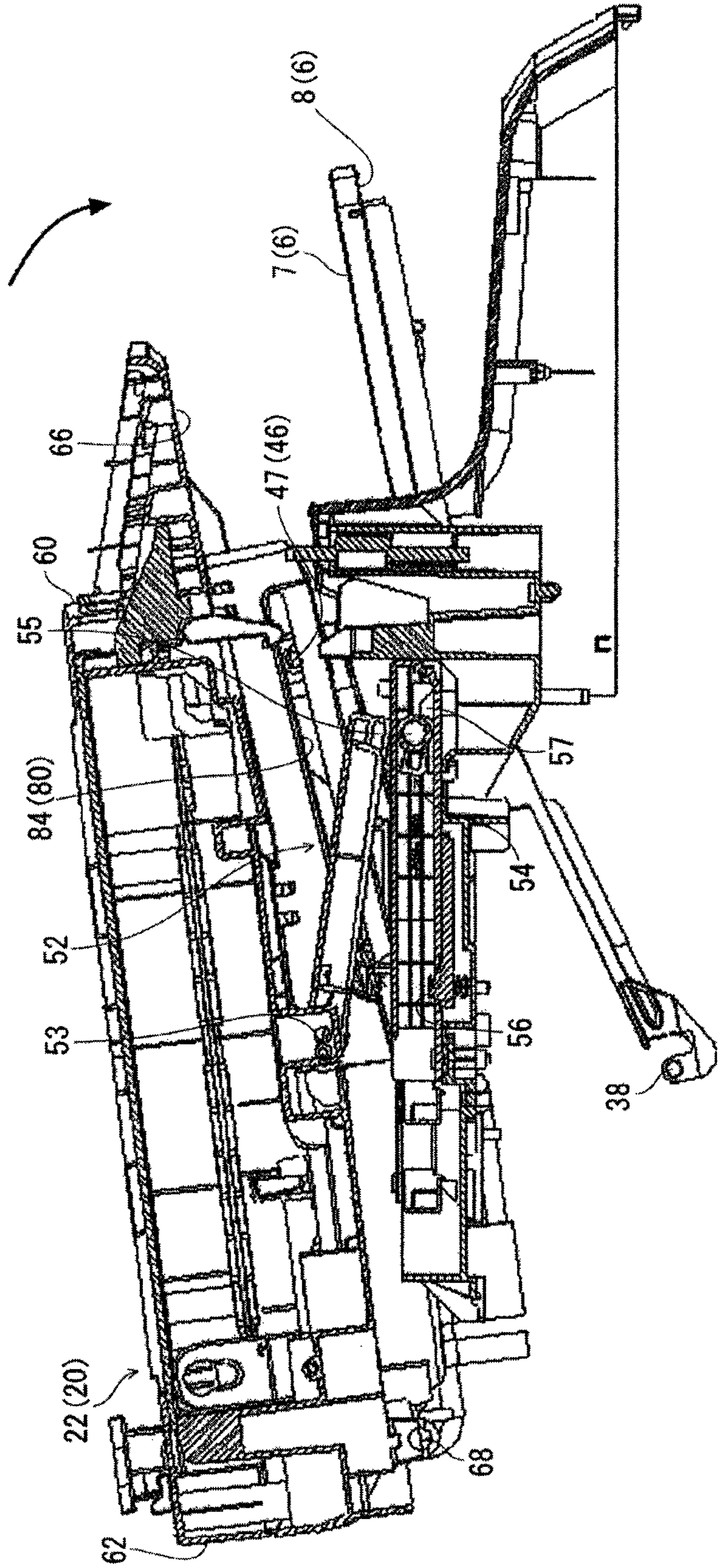
FIG. 9 is a side view illustrating the configuration which the outer wall member is positioned at an outer wall non-access angle position.
Figure 10:
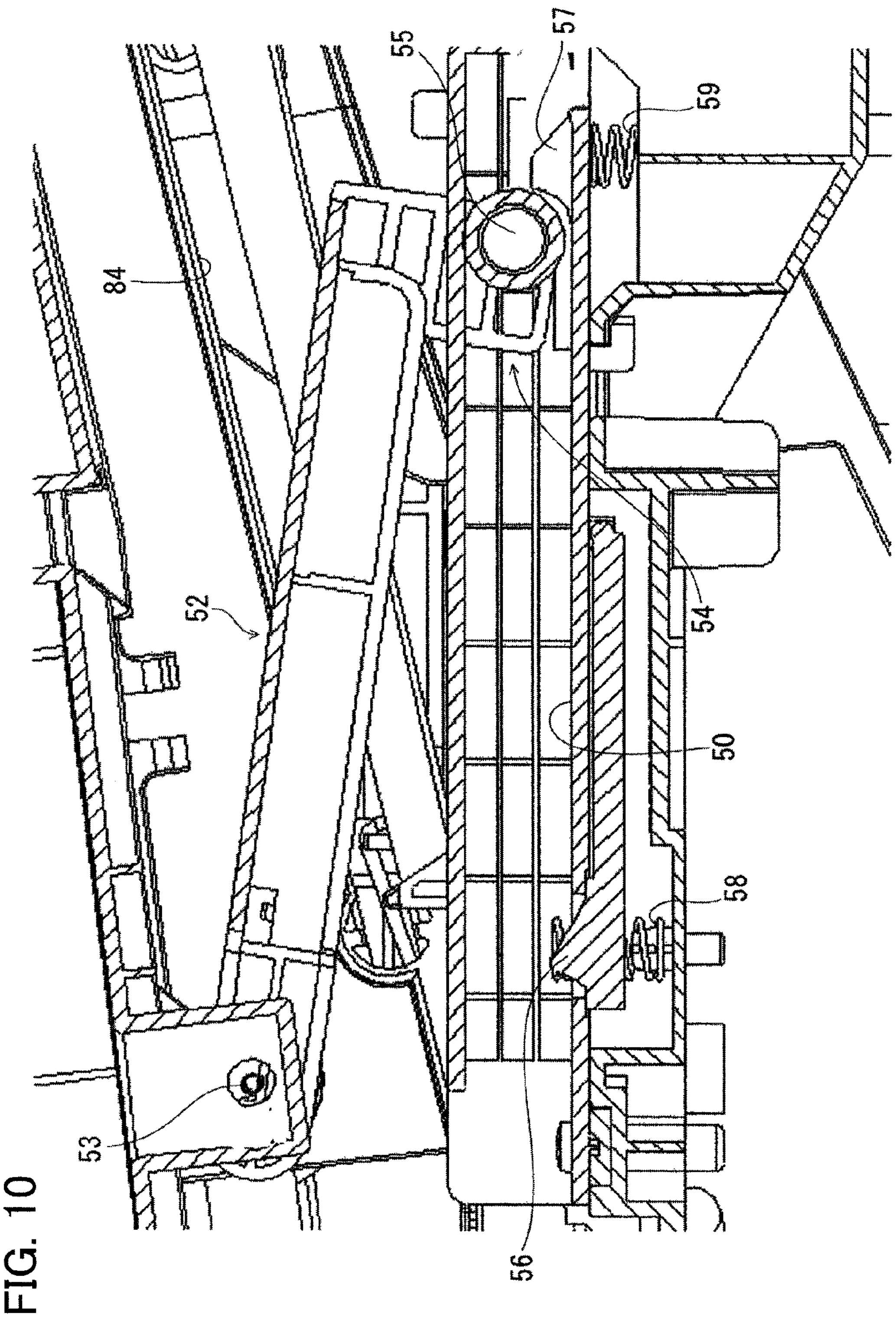
FIG. 10 is a schematic enlarged view of FIG. 9.
Figure 11:
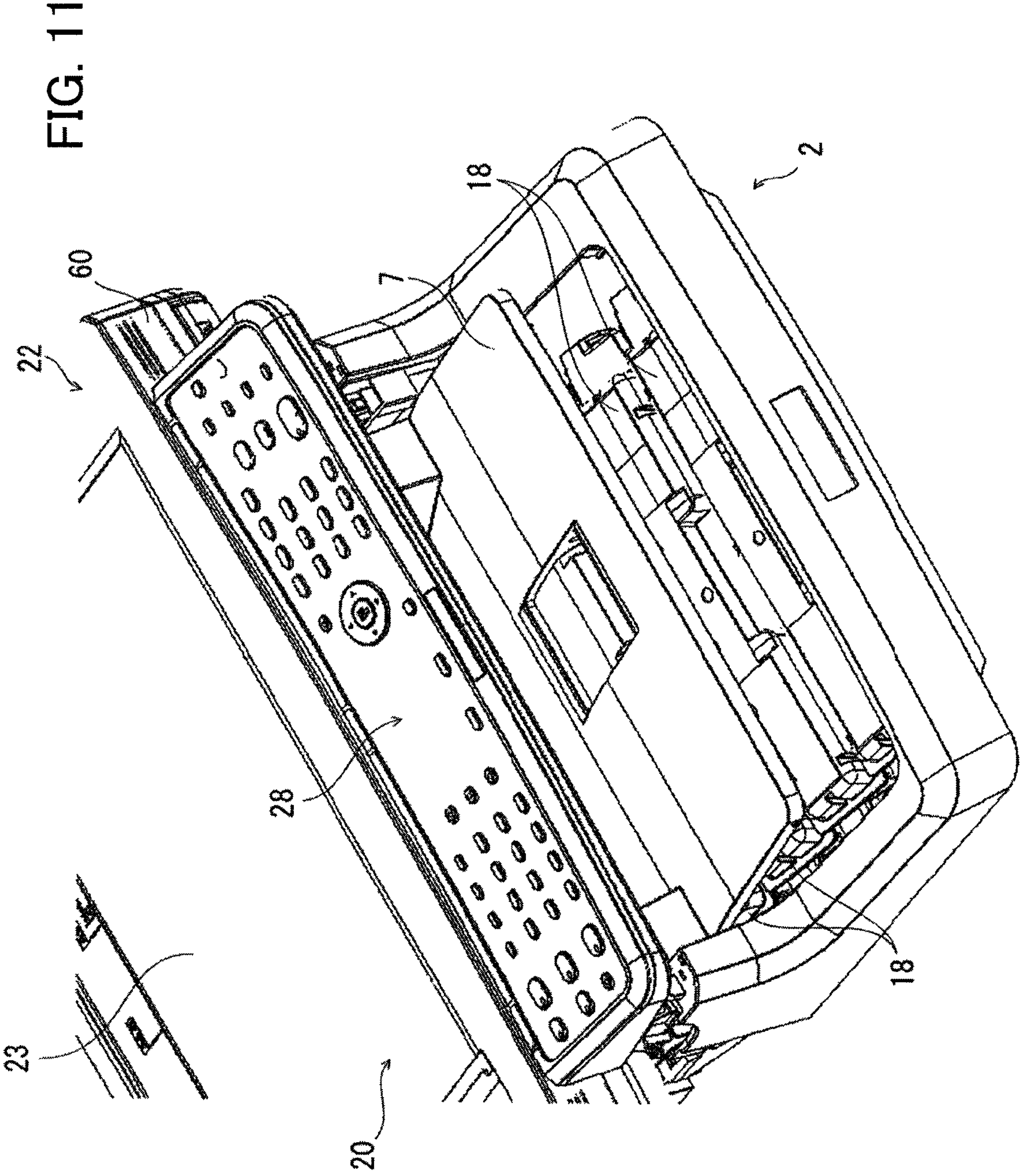
FIG. 11 is a perspective view of the MFP 1 in a configuration in which the outer wall member is positioned at an outer wall non-access angle position.

FIG. 3 is a perspective view of a multifunction peripheral in a configuration which a casing (housing body) is positioned at a housing body fully open angle position, and an outer wall member is positioned at an outer wall fully open angle position that exposes an inner portion of the apparatus main body. FIG. 4 is a side view of a state in which the casing (housing body) is positioned at a housing body fully open angle position, and the outer wall member is positioned at the outer wall fully open angle position. FIG. 5 is a schematic enlarged view of FIG. 4. FIG. 6 is an enlarged perspective view of an inner portion of the apparatus main body illustrated in FIG. 3. FIG. 7A is a perspective view of the coupling illustrated in FIG. 6. FIG. 7B is a perspective view of the coupling illustrated in FIG. 6. FIG. 8A describes the operation of the casing and the coupling illustrated in FIG. 6. FIG. 8B describes the operation of the casing and the coupling illustrated in FIG. 6. FIG. 8C describes the operation of the casing and the coupling illustrated in FIG. 6. FIG. 9 is a side view illustrating the configuration which the outer wall member is positioned at an outer wall non-access angle position. FIG. 10 is a schematic enlarged view of FIG. 9. FIG. 11 is a perspective view of the MFP 1 in a configuration in which the outer wall member is positioned at an outer wall non-access angle position.

The casing 22 houses the scanner unit 20 (image reading means) that enables optical reading of the document, and is disposed on an upper surface side of the apparatus main body 2. The casing 22 is connected to enable rotation of a first end 22*a* on the side with the back surface 2B (second surface) of the apparatus main body 2.

The casing 22 includes a lower surface 66 that covers the lower side or the like of the operation panel 28 and the upper surface that disposes the contact glass 23 (FIG. 3), and a front surface 60, back surface 62 and a side surface 64 that are formed to connect the upper surface and the lower surface 66.

The side surfaces 64, 64 are formed on both end portions in the longitudinal direction of the casing 22. A front surface (open side, free end side and second end side of the housing body) on which the operation panel 28 is disposed on the front end of the side surfaces 64, 64 (front side in FIG. 1), and the back surface (supporting side, connecting end and first end of housing body) 62 is disposed to face the front surface 60 on the inner end (inner side in FIG. 1).

The casing 22 is mounted to freely rotate on the apparatus main body 2 at the reading support point 68 provided at a predetermined position of the back surface 62.

The casing 22 is mounted on the apparatus main body 2 to rotate and displace to a fully closed angle position at which the second end 22*b* near to the front surface 2A (first surface) of the apparatus main body 2 is disposed in closest proximity to the apparatus main body 2 (FIG. 1), a housing body fully open angle position at which the second end 22*b* is most separated from the apparatus main body 2 (FIG. 3), and housing body no-access angle position between the housing body fully closed angle position and the housing body fully open angle position and in proximity to the housing body fully open angle position (FIG. 9 to FIG. 11).

When the casing 22 is disposed at the housing body fully open angle position, the casing 22 is retained at the housing body fully open angle position since the second end 52*b* of the retaining link 52 is retained at the second position by the first stopper 56 (first retaining portion).

When the casing 22 is disposed at a position at which the rotation angle is smaller than the housing body fully open angle position, the weight of the casing 22 displaces the second end 52*b* of the retaining link 52 towards the front surface 2A (first surface), and the casing 22 displaces and rotates towards the housing body fully closed angle position and is retained at the housing body non-access angle position since the other end 52*b* of the retaining link 52 is retained at the third position by the second stopper 57 (second retaining portion).

The outer wall member 6 is disposed between the apparatus main body 2 and the casing 22.

The outer wall member 6 is connected to the casing to displace and rotate in response to the displacement and rotation of the casing 22. The outer wall member 6 is configured so that the rotation angle of the outer wall member 6 when the casing 22 is at the housing body fully open angle position is larger than the rotation angle of the casing 22. "Rotation angle" as used herein is the rotation angle with reference to the outer wall fully closed angle position.

The outer wall member 6 is connected to the apparatus main body 2 to displace and rotate to an outer wall fully closed angle position at which service units (exchangeable components) in an inner portion of the apparatus main body 2 are not exposed (FIG. 1), to an outer wall fully open angle position at which the service units (exchangeable components) in an inner portion of the apparatus main body 2 are exposed for exchange by a user (FIG. 3), and to an outer wall non-access angle position at which the service units (exchangeable components) in an inner portion of the apparatus main body 2 has an angular position enabling exposure but not enabling exchange by a user (FIG. 9 to FIG. 11).

More specifically, when the casing 22 is positioned at the housing body fully closed angle position, the outer wall member 6 is positioned at the outer wall fully closed angle position at which service units (exchangeable components) in an inner portion of the apparatus main body 2 are not exposed (FIG. 1).

When the casing 22 is positioned at the housing body fully open angle position, the outer wall member 6 is positioned at the outer wall fully open angle position at which the service units (exchangeable components) in an inner portion of the apparatus main body 2 are exposed for exchange by a user (FIG. 3).

When the casing 22 is positioned at the housing body non-access angle position, the outer wall member 6 is positioned at the outer wall non-access angle position at which the service units (exchangeable components) in an inner portion of the apparatus main body 2 have an angular position enabling exposure but not enabling exchange by a user (FIG. 9 to FIG. 11).

When the casing 22 is disposed at the housing body fully open angle position, the outer wall member 6 is retained at the outer wall fully open angle position.

When the casing 22 is disposed at a position having a rotation angle that is smaller than the housing body fully open angle position, the outer wall member 6 displaces and rotates towards the outer wall fully closed angle position and is retained at the outer wall non-access angle position.

A suspension mechanism that is connected to the outer wall member 6 is provided on the lower surface 66 of the casing 22 at a position that faces the surface 7 of the outer wall member 6. More specifically, as shown in FIGS. 1, 3 and 4, the suspension mechanism includes an open rail 80, an arm portion 42, and a link pin 46. The open rail 80 is formed on the lower surface 66.

The open rail 80 is positioned respectively on the left and right ends of the surface 7 as illustrated in FIG. 1.

The open rail 80 includes a cylindrical main body 82 that is opened with respect to the top and bottom of the MFP 1.

The opening is formed in a rectangular shape, and extends from the front surface 2A (first surface) towards the back surface 2B (second surface) of the MFP 1.

An outer groove 83 and an inner groove 84 that penetrate the peripheral wall and thereby communicate with each opening are formed on the cylindrical main body 82 (FIGS. 1, 3, 4).

FIG. 4 is a sectional view in which the right side of the open rail 80 (the inner side for example in FIG. 3) is seen from the front surface of the MFP 1 for example in FIG. 1.

More specifically, the inner groove 84 extends from the front surface 2A side of the MFP 1 towards the back surface 2B side on the inner peripheral wall of the cylindrical main body 82 (FIG. 1 and FIG. 4). The inner groove 84 is formed to extend in a first direction X.

On the other hand, the outer groove 83 extends in the same manner from the front surface 2A of the MFP 1 towards the back surface 2B on the outer peripheral wall of the cylindrical main body 82 (FIG. 3). The outer groove 83 is formed to extend in a first direction X.

The inner groove 84 and the outer groove 83 are disposed in a mutual opposed configuration. The outer groove 83 and the inner groove 84 are positioned at substantially the same height, and accommodate the link pin 46 that extends in a horizontal direction.

The link pin 46 is formed on the arm portion 42. The link pin 46 includes a head portion 47 and a leg portion 48. The head portion 47 is inserted into the inner groove 84. The leg portion 48 is inserted into the outer groove 83.

A hole that penetrates the peripheral wall of the cylindrical main body 82 is provided in proximity to an inner end of the outer groove 83 on the cylindrical main body 82, and the rotating portion 53 of the retaining link (retaining member) 52 described below is supported to rotate freely.

A hook member 61*a* that engages with the apparatus main body 2 is provided on the casing 22 (FIG. 4). The hook member 61*a* is formed near the front surface 2A on the lower surface 66. The hook member 61*a* is configured to project downwardly, and to engage on the right and the left projecting side of the apparatus main body 2 in proximity to the front surface 60.

Furthermore, as illustrated in FIG. 1, an operation lever 61 is disposed on the right front surface 60 of the operation panel 28. When a user pulls the operation lever 61 forward, the engagement of the hook member 61*a* and the apparatus main body 2 is released.

The arm portion 42 above is provided on the surface 7 of the outer wall member 6. The arm portion 42 is formed respectively on the right and left ends of the surface 7 (FIG. 1). The arm portion 42 is disposed between each peripheral wall that includes the outer groove 83 and the inner groove 84 from below the opening of the cylindrical main body 82.

When the casing 22 and the outer wall member 6 are connected through the link pin 46 that is disposed on the arm portion 42, the outer wall member 6 is suspended below the casing 22.

As illustrated in FIG. 4, an outer wall support point 38 is provided on the inner end of the outer wall member 6. The outer wall member 6 is mounted to rotate freely on the apparatus main body 2 in the same manner as the casing 22.

The casing 22 and the apparatus main body 2 are connected on an outer side of the outer wall member 6. More specifically, the retaining link 52 that connects the casing 22 and the apparatus main body 2 is respectively provided further towards an outer side than the open rail 80 when viewed from the outer wall member 6.

A rotation portion 53 is formed on a first end 52*a* of the retaining link 52 (link member) (FIG. 4 and FIG. 5). The rotation portion 53 is connected to the hole above in proximity to the outer groove 83. The first end 52*a* of the retaining link 52 is rotatably connected to the casing 22.

A sliding portion 54 is formed on the second end 52*b* of the retaining link 52. The sliding portion 54 includes a round pin 55. The round pin 55 is inserted into the retaining rail 50 (guide portion) that is formed on the projecting right and left sides of the apparatus main body 2. The round pin 55 inserted into the retaining rail 50 is retained in a configuration enabling reciprocating displacement in a first direction X along the retaining rail 50. In this manner, the sliding portion 54 of the retaining link 52 (second end 52*b*) is configured to undergo reciprocating displacement in the first direction X.

More specifically, the sliding portion 54 (second end 52*b*) of the retaining link 52 is configured to undergo reciprocating displacement in the first direction X to be positioned at the first position that is closest to the front surface 2A (first surface) when the casing 22 is positioned at the fully closed angle position, and to be positioned at the second position that is closest to the back surface (second surface) when the casing 22 is positioned at the housing body fully open angle position (FIG. 4 and FIG. 5), and to be positioned at a third position between the first position and the second position when the casing 22 is positioned at the housing body non-access angle position.

The retaining link 52 is configured to enable retention at the housing body fully open angle position of the casing 22 when displaced to the housing body fully open angle position.

The retaining rail 50 is formed to extend in a first direction X on an upper side of the apparatus main body 2. The retaining rail 50 guides the second end 52*b* on the retaining link 52.

When a user draws the operation lever 61 of the MFP 1 forward in the configuration illustrated in FIG. 1 and releases the engagement of the hook member 61*a* and the apparatus main body 2, the front surface 60 of the casing 22 is raised approximately 10 mm from the apparatus main body 2. This is due to the fact that the casing 22 is pressed upwardly by a projection 49 illustrated in FIG. 3.

More specifically, a trigger spring (not shown) is provided respectively on the projecting right and left side of the apparatus main body 2, and biases the projection 49 upwardly. When the engagement of the hook member 61*a* and the apparatus main body 2 is released, the projection 49 presses the front surface 60 of the casing 22 upwardly with the biasing force of the spring.

Then, when the front surface 60 of the casing 22 is raised by a user, the open rail 80 becomes inclined, the rotating portion 53 of the retaining link 52 rotates from the front surface side of the MFP 1 relative to the open rail 80 toward the side surface, and the sliding portion 54 displaces from the front surface side of the MFP 1 along the retaining rail 50 towards the back surface. In this manner, the casing 22 starts to open in the direction of the arrow in FIG. 4 about the reading support point 68.

At the same time, since the open rail 80 inclines, the link pin 46 of the arm portion 42 of the outer wall member 6 is guided from the position on the right end of the outer groove 83 in FIG. 4 (the front of the outer groove 83 or the inner groove 84 in FIG. 3) to the position on the left end of the outer groove 83 (the inner position of the outer groove 83 or the inner groove 84 in FIG. 3). In this manner, the outer wall member 6 opens in the direction of the arrow in FIG. 4 about the outer wall support point 38 (rotation angle approximately 60°).

When the distance between the reading support position 68 and the outer wall support point 38 increases, the rotation angle of the outer wall member 6 (open angle) is further increased.

A first stopper 56 (first retaining portion) is provided on the retaining rail 50 (FIG. 5). The first stopper 56 is provided at a position in contact with the sliding portion 54 of the retaining link 52 in the orientation illustrated in FIG. 3 and FIG. 4, and can maintain a fully opened angle position of the outer wall member 6.

That is to say, in a configuration in which the casing 22 is positioned at the housing body fully open angle position, the first stopper 56 (first retaining portion) restricts displacement towards the front surface 2A (first surface) of the retaining link 52 that is disposed at the second position.

More specifically, the first stopper 56 is biased upwardly by the stopper spring 58 (FIG. 5). Firstly, when the sliding portion 54 displaces towards the back surface 2B of the MFP 1 along the retaining rail 50, and the sliding portion 54 comes into contact with the first stopper 56, the first stopper 56 is pressed below the retaining rail 50 against the biasing force of the stopper spring 58.

Then, when the sliding portion 54 displaces further towards the back surface 2B of the MFP 1 from the position to which the first stopper 56 has been pressed, the first stopper 56 protrudes above the retaining rail 50 due to the biasing force of the stopper spring 58, and engages with the sliding portion 54 (FIG. 5).

The first stopper 56 retains the second end 52*b* (sliding portion 54) of the retaining link 52 at the second position.

In this manner, the casing 22 that is opened in the direction of the arrow in FIG. 4 about the reading support point 68 is retained in the configuration illustrated in FIG. 3 and FIG. 4 (rotation angle: approximately 40°).

As illustrated in FIG. 3 and FIG. 4, when the back surface 8 of the outer wall member 6 is visible from an external position, a user can access, and can easily exchange the service units (exchangeable components) housed in the apparatus main body 2, for example in the present embodiment, the intermediate transfer belt 12, the drum unit 14, the developing unit 16, the toner containers 18, and the like.

The orientation of the outer wall member 6 illustrated in FIG. 3 and FIG. 4 is configured by the position of the outer wall member 6 at the outer wall fully open angle position. The outer wall fully open angle position at which the outer wall member 6 has a substantially maximum open configuration.

When the outer wall member 6 is positioned at the outer wall fully open angle position, a user can exchange various types of service units (exchangeable components) disposed in an inner portion of the apparatus main body 2. More specifically, a user can easily grasp and remove a service unit disposed in the apparatus main body 2 to an external position.

When the outer wall member 6 is positioned at the outer wall fully open angle position, the inner portion of the apparatus main body 2 is exposed, and the engagement between the service unit and the apparatus main body 2 is completely released. Therefore, a user can easily exchange various types of service units (exchangeable components) disposed in an inner portion of the apparatus main body 2. The engagement between the service units and the apparatus main body will be described below.

In the orientation of the outer wall member 6 illustrated in FIG. 1 (outer wall fully closed angle position), the service unit is completely engaged with the apparatus main body 2, and a user cannot remove the service unit from the apparatus main body 2.

In contrast, in the present embodiment, when the outer wall member 6 is positioned at less than the outer wall fully closed angle position (a small rotation angle), although the casing 22 is depressed under its own weight and is not at the outer wall fully closed angle position (fully closed orientation), closure (displacement and rotation) is enabled to a housing body non-access angle position at which a user cannot grasp the service unit (FIG. 9 to FIG. 11).

As illustrated in FIG. 9 and FIG. 10, a second stopper (second retaining portion) 57 is provided in the retaining rail 50.

The second stopper 57 is provided near to the front surface 2A of the MFP 1 on the retaining rail 50, and enables maintenance of the outer wall non-access angle position of the outer wall member 6 (outer wall non-access angle).

More specifically, the second stopper 57 is biased upwardly by a stopper spring 59 (FIG. 10), and the sliding portion in the orientation in FIG. 4 displaces along the retaining rail 50 towards the front surface 2A of the MFP 1. When the round pin 55 of the sliding portion 54 comes into contact with the second stopper 57, the sliding portion 54 is retained at the third position.

The second stopper 57 retains the second end 52*b* (sliding portion 54) of the retaining link 52 at the third position.

That is to say, although a user raises the front surface 60 of the casing 22, when a position is not reached at which the sliding portion 54 is engaged with the first stopper 56, the sliding portion 54 displaces along the retaining rail 50 towards front surface 2A of the MFP 1, and the casing 22 starts to close in the direction of the arrow in FIG. 9 about the reading support point 68.

In the same manner, the link pin 46 is guided from the left end position of the outer groove 83 (FIG. 4) to the right end position of the outer groove 83 (FIG. 9), and the outer wall member 6 closes in the direction of the arrow in FIG. 9 about the outer wall support point 38. When the round pin 55 abuts with the second stopper 57, and the outer wall member 6 is retained at the outer wall non-access angle position (rotation angle: approximately 10°-20° (FIG. 10 and FIG. 11). The rotation angle with reference to the outer wall fully closed angle position at the outer wall non-access angle position is from 10° to 20°.

In a configuration in which the outer wall member 6 illustrated in FIG. 9 and FIG. 11 is positioned at the outer wall non-access angle position, although a user can make contact with a finger with the service unit, and more specifically, with the magenta toner container 18 positioned in closest proximity to the front surface 2A of the MFP 1 as illustrated in FIG. 11. Since the space is only of the size of the thickness of the finger, the toner container 18 cannot be grasped.

Thereafter, when the user presses the front surface 60 of the casing 22 downwardly, since the sliding portion 54 displaces further towards the front surface 2A of the MFP 1, the round pin 55 rides onto the second stopper 57, and the second stopper 57 is pressed below the retaining rail 50 against the biasing force of the stopper spring 59.

When the sliding portion 54 displaces from the position to which the second stopper 57 is pressed further towards the front surface 2A of the MFP 1, the second stopper 57 protrudes above the retaining rail 50 due to the biasing force of the stopper spring 59 and engages the sliding portion 54. In this manner, the casing 22 is retained at the fully closed orientation in FIG. 1 (housing body fully closed angle position, rotation angle: 0°).

However, in the present embodiment, the connection and separation operations between the service unit and the apparatus main body are connected to respond to the opening and closing operations of the outer wall member 6.

As an example, the operation in relation to the toner container 18 will be described.

As illustrated in FIG. 6, firstly, the toner container 18 includes a substantially rectangular container main body that is mounted in the apparatus main body 2 so that the longitudinal direction is aligned in a substantially orthogonal orientation to a first direction X that connects the front surface 2A and the back surface 2B of the MFP 1. In FIG. 6, the black and yellow toner containers 18 are illustrated in a mounted configuration, and the cyan and magenta toner containers 18 are illustrated prior to mounting.

Each toner container 18 includes a drive coupling (component connection portion) 79 or a shutter (component connection portion: not shown) on a longitudinal end face.

In FIG. 6, the front drive coupling 79 can be engaged with the drive coupling (main body connection portion: not shown) provided on the apparatus main body 2, and enables rotation of a screw member (not illustrated) in the container main body.

Furthermore, a shutter is provided on the opposite side to the drive coupling 79, and can be engaged with the shutter drive coupling (main body connection portion) 70 in the inner side of FIG. 6. The shutter enables opening and closing of the toner supply port (not shown).

More specifically, in the fully open orientation of the outer wall member 6 (outer wall fully open angle position), (FIG. 6), a user presses the respective toner containers 18 downwardly along the guide groove 29 that is in the shape of a reversed letter L. When each toner container 18 is positioned and fixed in the guide groove 29, the drive coupling 79 faces the drive coupling of the apparatus main body 2, and the shutter faces the shutter drive coupling 70.

As illustrated in FIG. 7A and FIG. 7B, the shutter drive coupling 70 includes a rotation portion 71, a projection main body portion 72, and a support base 74. The rotation portion 71 includes a gear portion and a cylindrical wall portion. The gear portion is threadably engaged on a lower side of a rack 86 illustrated in FIG. 6. The rack 86 is threadably engaged through a pinion gear (not illustrated) on the gear portion 43 that is integrally formed on the back surface 8 of the outer wall member 6.

A notch is formed toward the projection main body portion 72 on the cylindrical wall portion of the rotation portion 71. As illustrated in FIGS. 7A and 7B, the rotation portion 71 includes an upright wall 71*a*, 71*b* and a taper 71*c* in contact with an arm 72*a* of the projection main body portion 72.

The taper 71*c* inclines so that the projection main body portion 72 projects towards the shutter as the rotation portion 71 rotates in a counterclockwise direction when seen from the toner container 18.

The upright wall 71*a*, 71*b* respectively extend with respect to the direction of the rotation shaft of the rotation portion 71. The interval between the upright wall 71*a* and the upright wall 71*b* corresponds to the width of the arm 72*a*. The upright wall 71*a* is connected to the taper 71*c*, and is shorter than the upright wall 71*b*. The upright walls 71*a*, 71*b* and the taper 71*c* are placed in contact with the arms 72*a*, 72*a* by being mutually formed at a 180° deviation (FIG. 7B).

The projection main body portion 72 is configured to enable the inner side of the outer wall that includes the arms 72*a*, 72*a* to engage with the shutter. A pressing spring 73 is disposed between the projection main body portion 72 and the support base 74. The pressing spring 73 biases the projection main body portion 72 toward the shutter.

The support base 74 is fixed to the apparatus main body 2. The support base 74 houses the projection main body portion 72 on an inner side of the peripheral wall 74*a*.

During a closing operation of the casing 22, that is to say, when a fully open configuration of the outer wall member 6 that enables pulling out (exchanging) of the service units (outer wall fully closed angle position, FIG. 3 to FIG. 6) shifts to a configuration in which the outer wall member 6 has a non-access angle (outer wall non-access angle position, FIG. 9 to FIG. 11), the outer wall member 6 rotates in the clockwise direction in FIG. 6.

In this manner, as illustrated in FIG. 8 A, the rack 86 starts to displace towards the back surface 2B of the MFP 1.

As illustrated in FIG. 8A and FIG. 8B, the rotation portion 71 starts to rotate in a counterclockwise direction together with the displacement in the left direction by the rack 86.

Since the projection main body portion 72 is pressed towards the shutter by the biasing force of the pressing spring 73, the arms 72*a*, 72*a* move forward towards the upright wall 71*a* along the taper 71*c*. In this manner, the projection main body portion 72 projects gradually more towards the toner container 18 than the rotation portion 71.

More specifically, when the outer wall member 6 is closed, and the rotation angle reaches an angle that is larger than the rotation angle at the outer wall non-access angle position (for example, 30°), the arms 72*a*, 72*a* transfer from the taper 71*c* to the upright wall 71*a*, and undergo further displacement along the upright walls 71*a*, 71*b* due to the biasing force of the pressing spring 73. In this manner, as illustrated in FIG. 8B, the projection main body portion 72 undergoes maximum projection towards the toner container 18, and the inner side of its outer wall is completely engaged with the shutter.

That is to say, in the present embodiment, the apparatus main body 2 includes a main body connection portion that is projected toward the service unit (exchangeable component) in response to an closing operation of the casing 22, and when the casing 22 is positioned at a connection angle position that is a predetermined rotation angle with reference to the fully closed angle position, the main body connection engages with the component connection portion. The rotation angle with reference to the fully closed angle position in the housing body non-access angle position is smaller than the predetermined rotation angle.

Next, when the outer wall member 6 is closed (rotated to the outer wall fully closed angle position), and the rack 86 displaces further to the left, the projection main body portion 72 on which the arms 72*a*, 72*a* are already retained by the upright wall 71*a*, 71*a* rotates in a counterclockwise direction together with the rotation portion 71. The projection main body portion 72 rotates through approximately 90° from the configuration illustrated in FIG. 8B to the configuration illustrated in FIG. 8C. As a result, the shutter rotates and the toner supply port is opened.

The drive coupling 79 described above (FIG. 6) is engaged with the drive coupling of the apparatus main body 2 in the same manner as the shutter.

The drive coupling of the apparatus main body 2 that engages with the drive coupling 79 is configured from a rotation portion 71 on which the taper 71*c* is disposed towards the apparatus main body 2 of the shutter drive coupling 70. The taper 71*c* engages with the taper formed on the apparatus main body 2.

The following description will be performed using the reference numerals in the drive coupling 70. The rotation portion 71 displaces forwards along the taper, the arms 72*a*, 72*a* abut with the other end face of the rotation portion 71 and displace together in a forward orientation. The projection main body portion 72 protrudes gradually towards the drive coupling 79. The projection main body portion 72 is connected to a drive motor, and is driven and rotated as required.

When rotation and displacement are executed so that the rotation angle of the outer wall member 6 (open angle) becomes smaller, and a rotation angle (for example, 30°) is reached that is larger than the rotation angle at the outer wall non-access angle position, the projection main body portion 72 projects towards the toner container 18 (maximum projection position), and the engagement of the projection main body portion 72 and the drive coupling 79 is completed.

When the drive coupling 79 and the drive coupling of the apparatus main body 2 are engaged, the screw member is rotated by the motive force from the drive coupling of the apparatus main body 2 and the drive coupling 79, and the peripheral toner is collected towards the toner supply port. Toner is supplied from the toner supply port to the development unit 16 corresponding to the toner container.

According to the present embodiment, the casing 22 that houses the scanner unit 20 is rotatably supported with respect to the apparatus main body 2. When the casing 22 is opened with respect to the apparatus main body 2, the outer wall member 6 is connected to displace in response to an opening operation of the casing 22. In this manner, the MFP 1 adopts a configuration in which a user can view the print engine 10 in the apparatus main body 2 from an external position.

Furthermore, a configuration in which the casing 22 and the outer wall member 6 are in an open configuration is maintained by the retaining link 52. The retaining link 52 for example retains the angle position of the outer wall member 6 (casing 22) at an angle position that enables a user to access a toner container 18.

More specifically, the retaining link 52 retains an open configuration in the outer wall member 6 at a fully open angle position that enables not only contact with the toner container 18 with the finger of a user but also gripping of the toner container 18 with the hand of a user.

When the outer wall member 6 is positioned at an angle position which is more closed than the outer wall fully open angle position (when the rotation angle is less than a fully open angle), the retaining link 52 cannot retain the outer wall member 6 in an open configuration that enables a user to grip the toner container 18. The sliding portion 54 of the retaining link 52 displaces towards the front surface 2A of the MFP 1 due to the weight of the casing 22, and the outer wall member 6 lowers (displaces and rotates) until the outer wall non-access angle position.

In this manner, a user experiences difficulty in gripping the toner container 18 even though it is possible to touch the toner container 18.

The MFP 1 according to the present embodiment enables access by a user into the apparatus main body 2 to be performed in a state in which the casing 22 is position at the housing body fully open angle position.

The MFP 1 according to the present embodiment prevents access by a user into the apparatus main body 2 when the casing 22 has not reached a fully open configuration (housing body fully open angle position) since the casing 22 prior to reaching the fully open configuration (housing body fully open angle position) is closed at a position at which a user cannot grip the exchangeable products.

The MFP 1 according to the present embodiment communicates to a user the fact that the casing 22 (outer wall member 6) has not reached a fully open angle position at which the toner container 18 (exchangeable product) can be gripped, and access into the apparatus main body 2 is notified only at the fully open angle position. That is to say, the MFP 1 enables a user to understand that normal access into the apparatus main body 2 is not possible unless the casing 22 is lifted until the outer wall member 6 reaches the outer wall fully open angle position.

This result prevents erroneous operation in the apparatus main body 2, More specifically, as described above, an operation is prevented in which the toner container 18 in the engaged state is gripped and pulled from the apparatus main body 2, notwithstanding a state of engagement between the toner container 18 and the apparatus main body 2. Furthermore, in this manner, the MFP 1 can be prevented from damage to the apparatus main body 2.

The first stopper 56 ensures maintenance of the casing 22 that is connected with the outer wall member 6 at a fully open angle (housing body fully open angle position) at which a user can grip the toner container 18 in the apparatus main body 2.

Even when the casing 22 is closed, and the outer wall member 6 is depressed to an outer wall non-access angle position (even when closed), the second stopper 57 can ensure maintenance of the outer wall member 6 in a slightly open configuration (outer wall non-access angle position).

Furthermore it is possible to prevent the hand of the user from becoming caught by the outer wall member 6 and the apparatus main body 2 since the outer wall member 6 does not reach the fully closed configuration (outer wall fully closed angle position) even when closed as described above.

Although the closing operation of the outer wall member 6 is linked to thereby start the engagement of the drive coupling 79 of the toner container 18 or the drive coupling 70 of the shutter and the apparatus main body 2 or the like, it is not particularly preferred that the toner container 18 is pulled from the apparatus main body 2 prior to a state of complete engagement.

However, in the present embodiment, the rotation angle for the outer wall non-access angel position is set to a smaller angle than the rotation angle at which the engagement of the drive coupling 79 or the drive coupling with the shutter is completed. Consequently, the engagement of the drive coupling 79 or the shutter 70 with the drive coupling is already completed when the outer wall member 6 is positioned at the outer wall non-access angle position.

Therefore, when the outer wall member 6 is positioned at the outer wall non-access angle position, even if the toner container 18 is pulled out by a user using a certain method, since the drive coupling 79 of the toner container 18 or the shutter with the drive coupling 70 of the apparatus main body 2 is completely engaged, damage to the apparatus main body 2 can be suppressed.

Furthermore, when the open angle (rotation angle) of the outer wall member 6 is large relative to the open angle (rotation angle) of the casing 22, even when the open angle (rotation angle) of the casing 22 is limited, the outer wall member 6 can be opened to a greater degree to thereby facilitate access into the apparatus main body 2 by a user.

The present invention is not limited to the above embodiments, and various modifications may be added to a degree that does not depart from the scope of the patent claims.

For example, in the above embodiments, the casing 22 includes an outer wall member 6, and the back surface 8 of the outer wall member 6 covers the toner container 18, or the like. However, the invention is not limited to this embodiment, and for example, the lower surface 66 of the casing 22 may form the outer wall of the apparatus main body 2, and directly cover the toner container 18, or the like.

Furthermore, the MFP 1 is one example of an image forming apparatus, and the present invention may naturally be applied also to copying machines, printers, facsimiles or the like in which the apparatus main body is opened by an opening operation of a casing.

In any of the above configurations, the same operation and effect as that described above is obtained.

What is claimed is:

1. An image forming apparatus comprising an apparatus main body having a first surface and a second surface opposed in a first direction, and housing exchangeable components;

a housing body for housing an image reading means that can optically read a document, the housing body disposed on an upper surface side of the apparatus main body, and in which a first end is rotatably connected near the second surface, the housing body rotatably displacing to a housing body fully closed angle position at which the second end near to the first surface is disposed in closest proximity to the apparatus main body, a housing body fully open angle position at which the second end is most separated from the apparatus main body, and a housing body non-access angle position that is between the housing body closed angle and the housing body fully open angle, and that is in proximity to the housing body fully closed angle position;

an outer wall member disposed between the apparatus main body and the housing body, the outer wall member rotatably connected to the apparatus main body, and displacing and rotating in response to the displacement and rotation of the housing body, and when the housing body is positioned at the housing body fully closed angle position, the outer wall member being positioned at an outer wall fully closed angle position at which the exchangeable components in the inner portion of the apparatus main body are not exposed, when the housing body is positioned at the housing body fully open angle position, the outer wall member being positioned at an outer wall fully open angle position at which the exchangeable components in the inner portion of the apparatus main body are exposed to enable exchange by a user, and when the housing body is positioned at the housing body non-access angle position, the outer wall member being positioned at an outer wall non-access angle position that has a rotation angle at which the exchangeable components in the inner portion of the apparatus main body are exposed but cannot be exchanged by a user, a link member configured to reciprocally displace in the first direction so that a first end is connected rotatably to the housing body, and a second end is positioned at a first position in closest proximity to the first surface when the housing body is positioned at the housing body fully closed angle position, is positioned at a second position in closest proximity to the second surface when the housing body is positioned at a housing body fully open angle position, and is positioned at a third position between the first position and the second position in proximity to the first position when the housing body is positioned at a housing body non-access angle position;

a first retaining portion retaining the second end of the link member at the second position, and a second retaining portion retaining the second end of the link member at the third position.

2. The image forming apparatus according to claim 1, wherein when the housing body is disposed at the housing body fully open angle position, the second end of the link member is retained at the second position by the first retaining portion, and the housing body is retained at the housing body fully open angle position, and when disposed at a position at which the rotation angle is smaller than the housing body fully open angle position, the weight of the housing body displaces the second end of the link member towards the first surface, and the housing body displaces and rotates towards the housing body fully closed angle position and is retained at the housing body non-access angle position since the other end of the retaining link is retained at the third position by the second retaining portion.

3. The image forming apparatus according to claim 2, wherein the outer wall member is retained at the outer wall fully open angle position when the housing body is disposed at the housing body fully open angle position, and when the housing body is disposed at a position at which the rotation angle is smaller than the housing body fully open angle position, the outer wall member displaces and rotates towards the outer wall fully closed angle position, and is retained at the outer wall non-access angle position.

4. The image forming apparatus according to claim 1, wherein the rotation angle with reference to the outer wall fully closed angle position at the outer wall non-access angle position is from 10° to 20°.

5. The image forming apparatus according to claim 1, wherein the exchangeable component includes a component connection portion, and the apparatus main body includes a main body connection portion that projects toward the exchangeable component in response to an closing operation of the housing body, and when the housing body is positioned as a connection angle position that is a predetermined rotation angle with reference to the fully closed angle position, the main body connection portion engages with the component connection portion, and the rotation angle with reference to the fully closed angle position at the housing body non-access angle position is smaller than the predetermined rotation angle.

6. The image forming apparatus according to claim 1, wherein the rotation angle with reference to the outer wall fully closed angle position at the outer wall fully open angle position is larger than the rotation angle with reference to the housing body fully closed angle position at the housing body fully open angle position.

* * * * *